United States Patent [19]

Mazaki et al.

[11] Patent Number: 5,358,661
[45] Date of Patent: Oct. 25, 1994

[54] LIQUID CRYSTALLINE POLYESTERS

[75] Inventors: Hitoshi Mazaki, Kawasaki; Takuya Matsumoto, Yokohama, both of Japan

[73] Assignee: Nippon Oil Company, Limited, Tokyo, Japan

[21] Appl. No.: 186,826

[22] Filed: Jan. 26, 1994

[30] Foreign Application Priority Data

Jan. 27, 1993 [JP] Japan .................. 5-045625
Feb. 5, 1993 [JP] Japan .................. 5-056289

[51] Int. Cl.$^5$ .................. C09K 19/52; C08G 63/00
[52] U.S. Cl. .................. 252/299.01; 528/299; 528/308; 428/1
[58] Field of Search .......... 252/299.01, 299.62, 252/299.65, 299.66, 299.67; 528/299, 308; 428/1

[56] References Cited

U.S. PATENT DOCUMENTS

| | | | |
|---|---|---|---|
| 5,081,221 | 1/1992 | Watanabe | 528/308 |
| 5,206,752 | 4/1993 | Itoh et al. | 359/106 |
| 5,230,825 | 7/1993 | Ishii et al. | 252/299.01 |
| 5,260,109 | 11/1993 | Iida et al. | 428/1 |
| 5,288,426 | 2/1994 | Itoh et al. | 252/299.5 |

*Primary Examiner*—Shean Wu
*Attorney, Agent, or Firm*—Scully, Scott, Murphy & Presser

[57] ABSTRACT

It is intended to provide a novel polyester which is optically active, can be prepared easily and inexpensively and is superior in stability and solubility in solvents.

A liquid crystalline polyester consisting essentially of repeating units represented by the following formulae (a), (b), or (b') and (c):

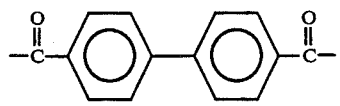

[a]

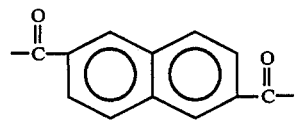

[b]

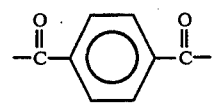

[b']

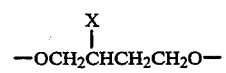

[c]

where the repeating unit c contains an optically active carbon and X is an alkyl group having 1 to 4 carbon atoms or a halogen atom, the repeating units a, b or b' and c being in mole ratios such that a/b is in the range from 95/5 to 5/95, a/b' is range from 95/5 to 50/50 and (a+b)/c or (a+b')/c is approximately 1.

3 Claims, 3 Drawing Sheets

LIQUID CRYSTALLINE POLYESTERS

BACKGROUND OF THE INVENTION

The present invention relates to a novel liquid crystalline polyester.

Recently, as to liquid crystalline polymers, researches and developments have been made actively in the field of high-performance materials utilizing high heat resistance and moldability and also in the field of functional materials utilizing changes in the liquid crystal structure caused by heat or by an external field such as electric field. On the other hand, in the functional material field, researches have been made actively for attaining the application of such polymers to optical recording, non-linear optical materials, alignment film for crystal, optical fiber and optical element for a liquid crystal display, but commercialization has not been made yet. Most of the liquid crystalline polymers being studied in the functional material field are side-chain type liquid crystalline polymers having a mesogen group capable of forming liquid crystal on a side chain, with few application examples of main-chain type liquid crystalline polymers. In the case of side-chain type liquid crystalline polymers, however, complicated steps are required in both monomer preparation and polymer preparation, and the manufacturing cost is high, so those polymers are not suitable for industrial utilization. In contrast therewith, in the case of main-chain type liquid crystalline polymers, the manufacturing process is generally short, and the polymers are superior in stability. Above all, polyesters are most suitable in all of manufacturing aspect, cost and physical properties.

On the other hand, when viewed from the application aspect, liquid crystalline polymers having optically active units in the molecule are suitable as functional materials such as optical or thermal recording materials and non-linear optical materials because they have a liquid crystal phase such as cholesteric phase or chiral smectic C phase, and studies have been made actively about those polymers. Thus, optically active liquid crystalline polyesters are novel and promising polymers for use as functional materials, but are disadvantageous in that their solubility in solvents is low. In the case of using the polymers as functional materials, they are formed into films or thin films in many cases, which are formed from solutions of the polymers. Therefore, the low solubility of the polymers has been a serious problem in practical use.

It is the object of the present invention to provide a novel polyester which is optical active, easy to prepare, less expensive to manufacture and superior in stability and in solvent-solubility.

SUMMARY OF THE INVENTION

The present invention relates to a liquid crystalline polyester consisting essentially of repeating units represented by the following formulae (a), (b) or (b') and (c):

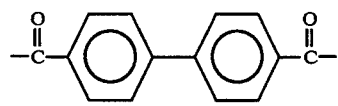

[a]

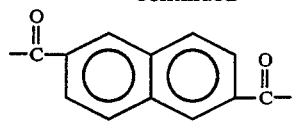

[b]

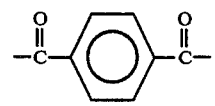

[b']

[c]

—OCH$_2$CHCH$_2$CH$_2$O— where the repeating unit c is a unit containing an optically active carbon, and X is an alkyl group having 1 to 4 carbon atoms or a halogen atom, the repeating units a, b or b' and c being in mole ratios such that a/b is in the range from 95/5 to 5/95, (a+b)/c is approximately 1, a/b' is 95/5–50/50 and (a+b')/c is approximately 1.

DETAILED DESCRIPTION OF THE INVENTION

Figure 1:
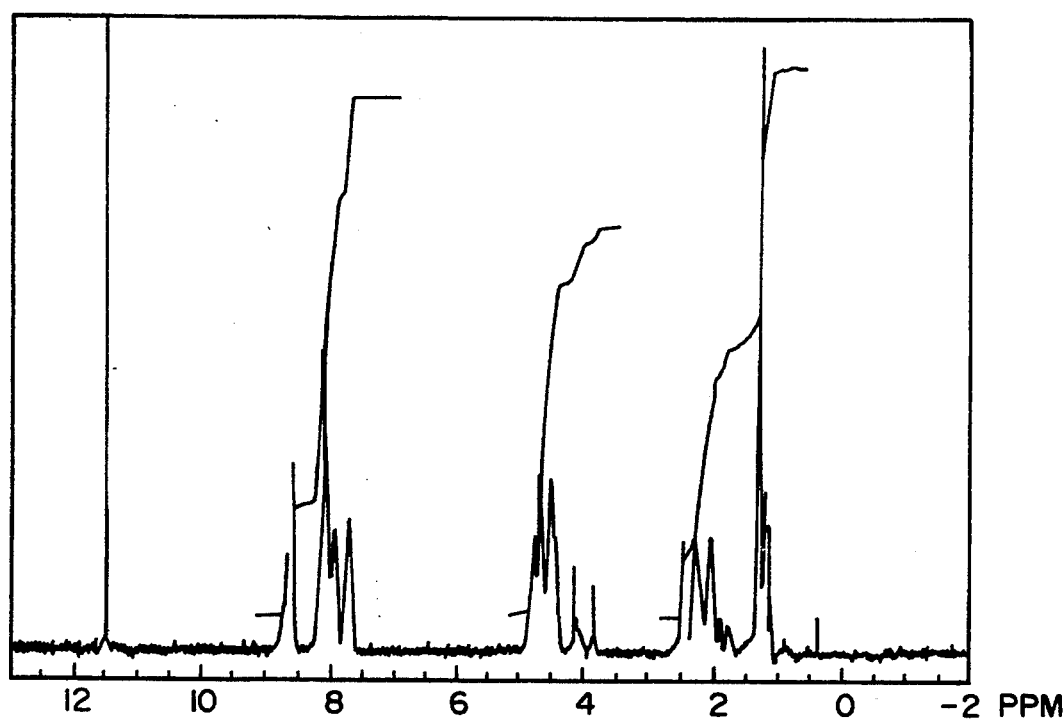
FIG. 1 shows $^1$H-NMR spectrum of the polymer prepared in Example 3 according to the present invention.
Figure 2:
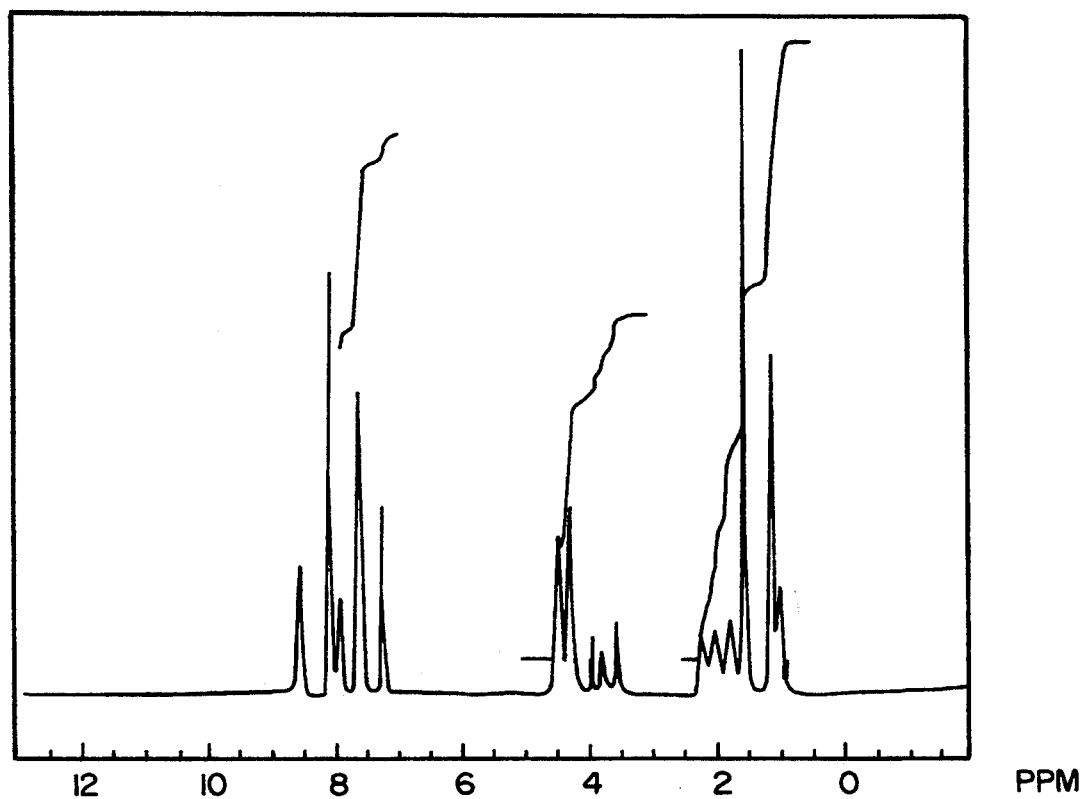
FIG. 2 shows $^1$H-NMR of the polymer prepared in Example 4 according to the present invention.
Figure 3:
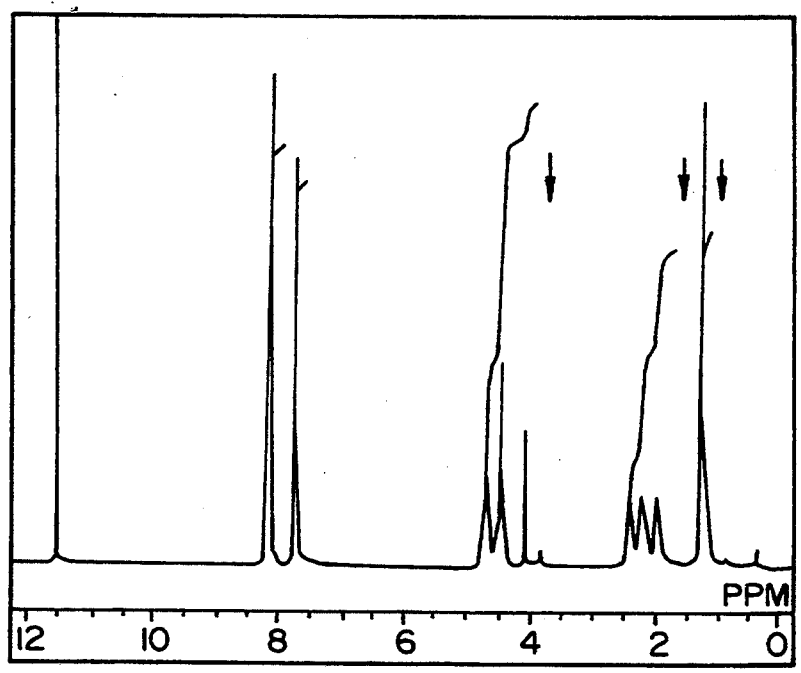
FIG. 3 shows $^1$H-NMR spectrum of the polymer prepared in Example 7 according to the present invention.
Figure 4:
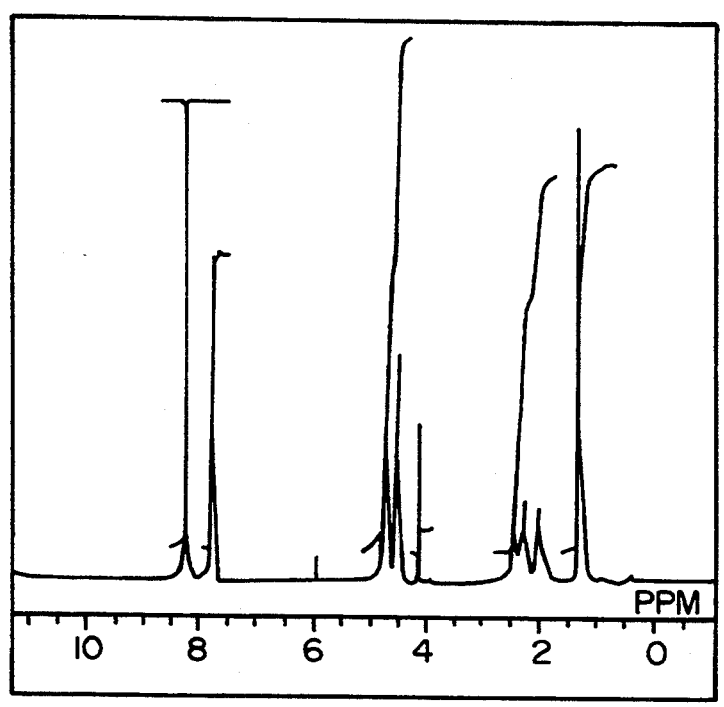
FIG. 4 shows $^1$H-NMR spectrum of the polymer prepared in Example 9 according to the present invention.
Figure 5:
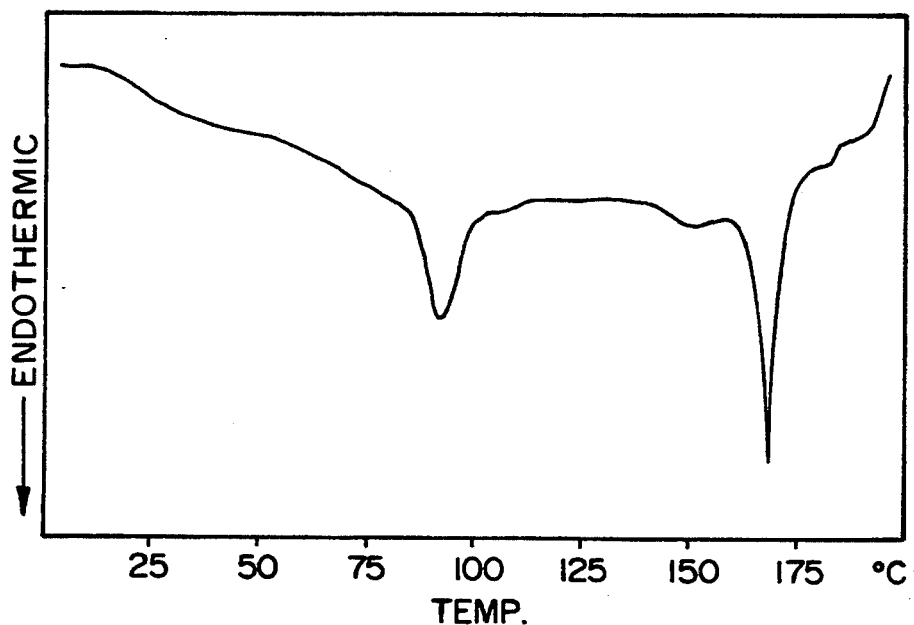
FIG. 5 shows DSC thermogram of the polymer prepared in Example 11 according to the present invention.
Figure 6:
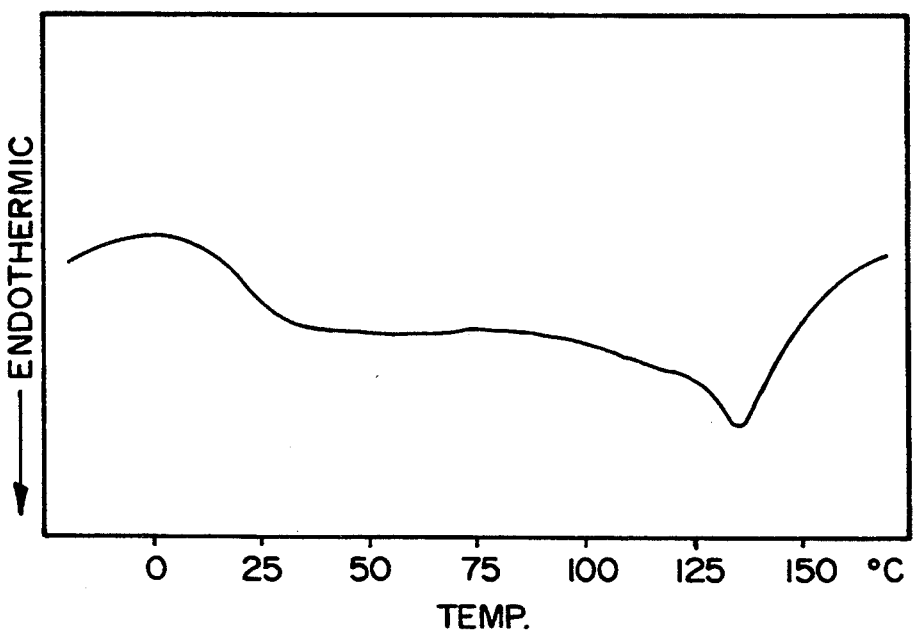
FIG. 6 shows DSC thermogram of the polymer prepared in Example 12 according to the present invention.

The present invention will be described in detail hereinunder.

The repeating unit a is derived from 4,4'-biphenyldicarboxylic acid or a functional derivative thereof such as a dialkyl derivative thereof, e.g. dimethyl or diethyl ester thereof, or a dihalogen derivative thereof. The repeating unit b is derived from 2,6-naphthalenedicarboxylic acid or a functional derivative thereof such as a dialkyl derivative thereof, e.g. dimethyl or diethyl ester thereof, or a dihalogen derivative thereof.

The repeating unit b' is derived from terephthalic acid or a functional derivative thereof such as a dialkyl derivative thereof, e.g. dimethyl or diethyl ester thereof, or dihalogen derivative thereof.

The repeating unit c is derived from an optically active 2-substituted-1,4-butanediol or a functional derivative thereof. It is absolutely necessary that the starting 2-substituted-1,4-butanediol be optically active. Its optical purity is 30% or more, preferably 50% or more, in terms of e.e. (enantiotropic excess). The substituent X is an alkyl group having 1 to 4, preferably 1 to 3, carbon atoms, more concretely methyl, ethyl, propyl, isopropyl, butyl or t-butyl, or a halogen atom such as F, Cl or Br. Particularly, methyl, ethyl and Cl are preferred. Of course, it is optional whether the repeating units are to be arranged in block or random form.

As to composition ratios (mole ratios) of the repeating units a, b and c, the a/b ratio is in the range from 95/5 to 5/95, preferably 90/10 to 10/90, more preferably 85/15 to 20/80. If the a/b ratio is larger than 95/5, that is, if the proportion of the biphenyldicarboxylic acid units is too high, the solvent-solubility will be deteriorated. On the other hand, if the a/b ratio is lower than 5/95, the formation of liquid crystal phase will become difficult.

As to composition ratios (mole ratios) of the repeating units a, b' and c, the a/b ratio is in the range from 95/5 to 50/50, preferably 90/10 to 60/40. If the a/b' ratio is larger than 95/5, that is, if the phenyldicarboxylic acid units are too many, the solvent-solubility will be deteriorated, so such ratio is undesirable. On the other hand, an a/b' ratio of lower than 50/50 is not desirable, either, because it becomes difficult for liquid crystal phase to be formed. The (a+b)/c or (a+b')/c ratio is approximately 1, usually in the range of 45/55 to 55/45, preferably 48/52 to 52/48, more preferably 50/50.

The molecular weight of the polymer is usually in the range of 0.05 to 3.0, preferably 0.07 to 2.0, in terms of an inherent viscosity, $\eta$ inh, as determined in phenol/tetrachloroethane mixed solvent (60/40 weight ratio) at 30° C. If the $\eta$ inh value is smaller than 0.05, the strength of the polymer may be deteriorated, and if it is larger than 3.0, the melt viscosity will become too high, thus requiring a longer time for the orientation of liquid crystal.

How to prepare the polymer of the present invention is not specially limited. There may be adopted a polymerization method known in the field concerned, for example a melt polymerization method or a solution polymerization method using an acid chloride of a corresponding dicarboxylic acid.

In the case where a melt polycondensation process is adopted, the polymer can be prepared, for example by the reaction of 4,4-biphenyldicarboxylic acid dimethyl ester (component $a^1$), 2,6-naphthalenedicarboxylic acid dimethyl ester (component $b^1$) or terephthalic acid dimethyl ester (component $b'^1$) and a 2-substituted-1,4-butanediol (component $c^1$) represented by the following general formula, at a high temperature and under a reduced pressure:

As examples of the 2-substituted-1,4-butanediol there are mentioned 2-methyl-1,4-butanediol, 2-ethyl-1,4-butanediol, 2-propyl-1,4-butanediol, 2-butyl-1,4-butanediol, 2-chloro-1,4-butanediol, 2-bromo-1,4-butanediol and 2-iodo-1,4-butanediol.

The molecular weight of the polymer can be controlled easily by controlling the polymerization time or the feed composition. Conditions for the polymerization are not specially limited, but usually involve a temperature of 150° C. to 350° C., preferably 200° C. to 300° C., a reaction time of 30 minutes or longer, preferably 1 to 20 hours, and a pressure of preferably a reduced pressure.

As to feed compositions (mole ratios) of the starting components $a^1$, $b^1$ and $c^1$ or $a^1$, $b'^1$, $c^1$, the value of $(a^1+b^1)/c^1$ or $(a^1+b'^1)/c^1$ is usually in the range from 40/60 to 60/40, preferably 45/55 to 55/45, more preferably 48/52 to 52/48, most preferably 50/50. The value of $a^1/b^1$ is usually in the range from 95/5 to 5/95, preferably 90/10 to 10/90, more preferably 85/15 to 20/80.

The value of $a^1/b'^1$ is usually in the range of 95/5 to 40/60 preferably 95/5 to 50/50, more preferably 90/10 to 60/40.

For accelerating the polymerization reaction there may be used a known metal salt such as, for example, sodium acetate or zinc acetate.

In the case of using the solution polymerization process, the desired polyester can be prepared easily, for example by dissolving a 4,4-biphenyldicarboxylic acid dihalide ($a^2$), a 2,6-naphthalenedicarboxylic acid dihalide ($b^2$) or a terephthalic acid dihalide ($b'^2$) and a 2-substituted-1,4-butanediol ($c^1$) of the foregoing general formula in a solvent, followed by heating in the presence of an acid acceptor. As examples of the 4,4-biphenyldicarboxylic acid dihalide there are mentioned 4,4-biphenyldicarboxylic acid dichloride and biphenyldicarboxylic acid dibromide. Examples of the 2,6-naphthalenedicarboxylic acid dihalide include 2,6-naphthalenedicarboxylic acid dichloride and 2,6-naphthalenedicarboxylic acid dibromide.

Examples of the terephthalic acid dihalide include terephthalic acid dichloride and terephthalic acid dibromide.

The solvent to be used is not specially limited, but as examples thereof are mentioned halogen containing solvents such as o-dichlorobenzene, dichloroethane and tetrachloroethane, polar solvents such as dimethylsulfoxide (DMSO), dimethylformamide (DMF) and N-methylpyrrolidone (NMP), and ether type solvents such as tetrahydrofurane (THF) and dioxane. The acid acceptor to be used is not specially limited, either. For example, there may be used pyridine, triethylamine or tripropylamine.

Conditions for the solution polymerization are not specially limited, but usually involve a temperature of 50° C. to 200° C., preferably 60° C. to 150° C., and a reaction time of 1 to 10 hours, preferably 2 to 7 hours.

As feed compositions (mole ratios) of the starring components $a^2$, $b^2$ and $c^1$ or $a^2$, $b'^2$ and $c^1$, the value of $(a^2+b^2)/c^1$ or $(a^2+b'^2)/c^1$ is usually in the range from 40/60 to 60/40, preferably 45/55 to 55/45, more preferably 48/52 to 52/48, most preferably 50/50. The $a^2/b^2$ ratio is in the range from 95/5 to 5/95, preferably 90/10 to 10/90, more preferably 85/15 to 20/80. The $a^2/b'^2$ ratio is in the range from 95/5 to 40/60, preferably 95/5 to 50/50, more preferably 90/10 to 60/40.

Since the polymer of the present invention contains an optically active unit, it exhibits a cholesteric phase mainly in the state of liquid crystal. Besides, since it can be prepared by a simple synthesis process using inexpensive monomers, the manufacturing cost is low and the stability is high. Further, since the polymer contains 2,6-naphthalenedicarboxylic acid unit or terephthalic acid unit, it is superior in its solubility in solvents and can be dissolved at high concentrations in various halogen-containing solvents, phenolic solvents or polar solvents. Therefore, by using a polymer solution in any of such solvents, the polymer can be easily formed into film or thin film and thus the application thereof to various functional materials is possible.

EXAMPLES

The following examples are given, but it is to be understood that the invention is not limited thereto. The following analyzing methods were used in those examples.

(1) Determination of Polymer Composition

Each polymer obtained was dissolved in deuterated chloroform or deuterated trifluoroacetic acid and the composition thereof was determined by using $^1$H-NMR of 400 MHz (JNM-GX400, a product of Japan Electron Optics Laboratory Co., Ltd.).

(2) Measurement of Inherent Viscosity

Determined at 30° C. in phenol/tetrachloroethane (60/40 weight ratio) mixed solvent, using a Ubbelohde's viscometer.

(3) Measurement of DSC

Determined using Du Pont 990 Thermal Analyzer.

(4) Observation using Optical Microscope

Observed using a polarizing microscope, BH2 (a product of Olympus Optical Co., Ltd.).

Example 1

100 mmol of 4,4-biphenyldicarboxylic acid dimethyl ester, 100 mmol of 2,6-naphthalenedicarboxylic acid dimethyl ester and 220 mmol of (S)-2-methyl-1,4-butanediol were fed into a glass reactor and reaction was allowed to take place in a nitrogen atmosphere at 220° C. for 5 hours to prepare a polymer. The polymer was dissolved in tetrachloroethane and the resulting solution was poured into, methanol to purify the polymer. The η inh of the polymer thus obtained was 0.26. According to DSC measurement and polarizing microscope observation, the polymer was found to have a cholesteric liquid crystal phase and a transition point from isotropic to cholesteric phase of 121° C. The polymer was dissolved homogeneously at a concentration of 10% in phenol/tetrachloroethane mixed solvent (60/40 weight ratio) and dimethylformamide.

Example 2

120 mmol of 4,4-biphenyldicarboxylic acid dichloride, 80 mmol of 2,6-naphthalenedicarboxylic acid dichloride, 200 mmol of (S)-2-ethyl-1,4-butanediol and 30 ml of pyridine were dissolved in 500 ml of o-dichlorobenzene and reacted in a nitrogen atmosphere at 70° C. for 3 hours. Thereafter, the reaction solution was poured into methanol and the resulting polymer was recovered. Further, the polymer was dissolved in tetrachloroethane and the resulting solution was poured into a large amount of methanol to purify the polymer.

The η inh of the polymer thus obtained was 0.31. According to DSC measurement and polarizing microscope observation the polymer was found to have a cholesteric liquid crystal phase and a transition point from isotropic to cholesteric phase of 126° C. Further, the polymer was dissolved homogeneously at a concentration of 10% in phenol/tetrachloroethane mixed solvent (60/40 weight ratio) and dimethylformamide.

Example 3–6

Polymers were prepared as Examples 3 to 5 in the same way as in Example 1 and a polymer was prepared as Example 6 in the same manner as in Example 2. Properties of these polymers are as shown in Table 1 below. All of the polymers exhibited a cholesteric liquid crystal phase and were dissolved well in phenol/tetrachloroethane mixed solvent and DMF.

Comparative Example 1

Using 4,4-biphenyldicarboxylic acid dimethyl ester, 2,6-naphthalenedicarboxylic acid dimethyl ester and (S)-2-methyl-1,4-butanediol, a polymer having a a/b/c mole ratio of 48/2/50 was prepared in the same way as in Example 1. The polymer had a η inh value of 0.31 and exhibited a cholesteric liquid crystal phase. But its solubility in phenol/tetrachloroethane mixed solvent and DMF was poor and white turbidity was observed at a 10 wt % concentration of the polymer.

Comparative Example 2

Using 4,4-biphenyldicarboxylic acid dichloride, 2,6-naphthalenedicarboxylic acid dichloride and (S)-2-ethyl-1,4-butanediol, a polymer having an a/b/c mole ratio of 2/49/49 was prepared in the same way as in Example 2. The η inh of the polymer was 0.29. The polymer was dissolved well in solvents, but the development of liquid crystal phase was not clearly recognized.

Example 7

90 mmol of 4,4-biphenyldicarboxylic acid dimethyl ester, 10 mmol of terephthalic acid dimethyl ester and 105 mmol of (S)-2-methyl-1,4-butanediol were fed into a glass reactor and reaciton was allowed to take place in a nitrogen atmosphere at 220° C. for 4 hours to prepare a polymer. The polymer was then dissolved in tetrachloroethane and the resulting solution was poured into a large amount of methanol to purify the polymer. The η inh of the polymer thus obtained was 0.24. According to DSC measurement and polarizing microscope observation, the polymer was found to have a cholesteric liquid crystal phase in the temperature range of 92° C. to 168° C. The polymer, at a concentration of 10%, was dissolved homogeneously in phenol/tetrachloroethane mixed solvent (60/40 weight ratio) and dimethylformamide.

Examples 8–10

In the same way as in Example 7 there were prepared polymers as Examples 8 to 10, which are shown in Table 2. All of the polymers exhibited a cholesteric liquid crystal phase at temperatures in the range between the transition point from crystal phase to liquid crystal phase and the transition point from liquid crystal phase to isotropic phase, and were dissolved well in phenol/tetrachloroethane mixed solvent (60/40 weight ratio) and dimethylformamide.

Example 11

55 mmol of 4,4-biphenyldicarboxylic acid dichloride, 45 mmol of terephthalic acid dichloride, 100 mmol of (S)-2-ethyl-1,4-butanediol and 20 ml of pyridine were dissolved in 300 ml of o-dichlorobenzene and reacted in a nitrogen atmosphere at 70° C. for 3 hours. Thereafter, the reaction solution was poured into methanol and the resulting polymer was recovered. Further, the polymer was dissolved in tetrachloroethane and the resulting solution was poured into a large amount of methanol to purify the polymer.

The η inh of the polymer thus obtained was 0.14. According to DSC measurement and polarizing microscope observation, the polymer was found to have a cholesteric liquid crystal phase between crystal phase and isotropic phase. Further, the polymer, at a concentration of 10 wt %, was dissolved homogeneously in phenol/tetrachloroethane mixed solvent (60/40 weight ratio) and dimethylformamide.

Examples 12–13

In the same way as in Example 11 there were prepared polymers as Examples 12 and 13, whose properties are as shown in Table 2. Both polymers exhibited a cholesteric liquid crystal phase and were dissolved well in phenol/tetrachloroethane mixed solvent (60/40 weight ratio) and dimethylformamide.

Comparative Example 3

Using 4,4-biphenyldicarboxylic acid dimethyl ester, terephthalic acid dimethyl ester and (S)-2-methyl-1,4-butanediol, a polymer having an a/b/c mole ratio of 48/2/50 was prepared in the same manner as in Example 7. The polymer had a η inh value of 0.33 and exhibited a cholesteric liquid crystal phase. But its solubility in phenol/tetrachloroethane mixed solvent and DMF was poor and white turbidity was observed at a 10 wt % concentration of the polymer.

Comparative Example 4

Using 4,4-biphenyldicarboxylic acid dichloride, terephthalic acid dichloride and (S)-2-ethyl-1,4-butanediol, a polymer having an a/b/c ratio of 12/39/49 was prepared in the same manner as in Example 11. The η inh of the polymer was 0.25. The polymer was dissolved well in the solvents, but the formation of liquid crystal phase was not clearly recognized.

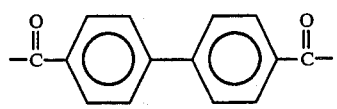 [a]

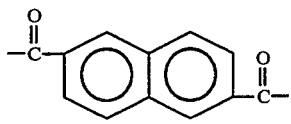 [b]

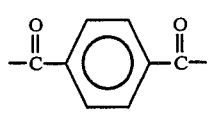 [b']

 [c]

where the repeating unit c contains an optically active carbon and X is an alkyl group having 1 to 4 carbon atoms or a halogen atom, the repeating units a, b and c

TABLE 1

Properties of the Polymers Prepared in Examples and Comparative Examples

| Example No. and Comparative Example No. | Polymer Composition[1] (mole %) | | | $X^{[1]}$ | η inh dl/g | Liquid Crystal Phase[2] | Solubility (10 wt %) Phenol/ Tetrachloro- ethane | DMF |
|---|---|---|---|---|---|---|---|---|
| Example | | | | | | | | |
| 1 | 25 | 25 | 50 | Me | 0.26 | Ch | ◉ | ◉ |
| 2 | 31 | 19 | 50 | Et | 0.31 | Ch | ◉ | ◉ |
| 3 | 16 | 33 | 51 | Me | 0.14 | Ch | ◉ | ◉ |
| 4 | 32 | 20 | 48 | Me | 0.64 | Ch | ◉ | ◉ |
| 5 | 9 | 41 | 50 | n-Pr | 0.51 | Ch | ◉ | ◉ |
| 6 | 42 | 9 | 49 | Cl | 0.12 | Ch | ◉ | ◉ |
| Comparative Example | | | | | | | | |
| 1 | 48 | 2 | 50 | Me | 0.31 | Ch | X | X |
| 2 | 2 | 49 | 49 | Et | 0.29 | — | ◉ | ◉ |

[1]Refer to general formula described in the specification.
[2]Ch: cholesteric phase
◉ good
X bad

TABLE 2

Properties of the Polymers Prepared in Examples and Comparative Examples

| Example No. and Comparative Example No. | Polymer Composition[1] (mole %) | | | $X^{[1]}$ | η inh dl/g | Liquid Crystal Phase[2] | Solubility (10 wt %) Phenol/ Tetrachloro- ethane | DMF |
|---|---|---|---|---|---|---|---|---|
| Example | | | | | | | | |
| 7 | 44 | 5 | 51 | Me | 0.24 | Ch | ◉ | ◉ |
| 8 | 40 | 10 | 50 | Me | 0.30 | Ch | ◉ | ◉ |
| 9 | 36 | 15 | 49 | Me | 0.18 | Ch | ◉ | ◉ |
| 10 | 28 | 22 | 50 | Et | 0.29 | Ch | ◉ | ◉ |
| 11 | 42 | 8 | 50 | Et | 0.14 | Ch | ◉ | ◉ |
| 12 | 42 | 7 | 51 | n-Pr | 0.51 | Ch | ◉ | ◉ |
| 13 | 34 | 16 | 50 | Cl | 0.79 | Ch | ◉ | ◉ |
| Comparative Example | | | | | | | | |
| 3 | 48 | 2 | 50 | Me | 0.33 | Ch | X | X |
| 4 | 12 | 39 | 49 | Et | 0.25 | — | ◉ | ◉ |

[1]Refer to general formula described in the specification.
[2]Ch: cholesteric phase
◉ good
X bad

What is claimed is:

1. A liquid crystalline polyester consisting essentially of repeating units represented by the following formulae (a), (b) or (b') and (c): or a, b' and c being in mole ratios such that a/b is in the range from 95/5 to 5/95, a/b' is in the range from 95/5 ~ 50/50 and (a+b)/c or (a+b')/c is approximately 1.

2. A liquid crystalline polyester as set forth in claim 1, wherein the repeating units a, b and c or a, b' and c are in mole ratios such that a/b is in the range from 90/10 to 10/90, a/b' is in the range from 90/10 to 60/40, and (a+b)/c or (a+b')/c is in the range from 45/55 to 55/45.

3. A liquid crystalline polyester as set forth in claim 1, having an inherent viscosity, $\eta$ inh, of 0.05 to 3.0 as determined in phenol/tetrachloroethane mixed solvent (60/40 weight ratio) at 30° C.

* * * * *